United States Patent
Lawler et al.

(10) Patent No.: US 9,441,699 B2
(45) Date of Patent: Sep. 13, 2016

(54) ORIFICE DISC FOR REGULATING FLOW IN DAMPER

(71) Applicant: Tenneco Automotive Operating Company Inc., Lake Forest, IL (US)

(72) Inventors: Tim Lawler, South Rockwood, MI (US); Chad Rummel, Oxford, MI (US); Elizabeth Robbins, Adrian, MI (US); Daniel T. Keil, Temperence, MI (US); Jeroen K. Paenhuysen, Ypsilanti, MI (US); John McGahey, Trenton, MI (US); Dajun Zhang, Troy, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 67 days.

(21) Appl. No.: 14/275,235

(22) Filed: May 12, 2014

(65) Prior Publication Data

US 2014/0332332 A1 Nov. 13, 2014

Related U.S. Application Data (60) Provisional application No. 61/822,494, filed on May 13, 2013.

(51) Int. Cl.
   *F16F 9/348* (2006.01)
(52) U.S. Cl.
   CPC .................. *F16F 9/3484* (2013.01)
(58) Field of Classification Search
   CPC ............ F16F 9/34; F16F 9/346; F16F 9/348; F16F 9/3482; F16F 9/3484
   See application file for complete search history.

(56) References Cited

U.S. PATENT DOCUMENTS

| 4,241,815 A | * | 12/1980 | Federspiel | F16F 9/3482 137/493 |
| 4,356,898 A | * | 11/1982 | Guzder | F16F 9/3482 188/280 |
| 4,512,447 A | * | 4/1985 | Miura | F16K 15/148 188/282.6 |
| 4,895,229 A | * | 1/1990 | Kato | F16F 9/3484 188/280 |
| 4,964,493 A | * | 10/1990 | Yamaura | F16F 9/3484 188/280 |
| 5,129,488 A | * | 7/1992 | Furuya | B60G 17/08 188/282.6 |

(Continued)

FOREIGN PATENT DOCUMENTS

KR 10-2010-0023076 3/2010

OTHER PUBLICATIONS

Search Report and Written Opinion in corresponding PCT Application No. PCT/US2014/037838 dated Sep. 3, 2014 (14 pages).

*Primary Examiner* — Robert A Siconolfi
*Assistant Examiner* — James Hsiao
(74) *Attorney, Agent, or Firm* — Harness, Dickey & Pierce, P.L.C.

(57) ABSTRACT

A shock absorber for a vehicle includes a pressure tube that defines a fluid chamber. A piston disposed within the fluid chamber divides the fluid chamber into an upper working chamber and a lower working chamber. The piston defines a compression passage and a rebound passage which extend through the piston between the upper working chamber and the lower working chamber. A valve disc assembly engages the piston and controls the flow of fluid between the upper working chamber and the lower working chamber. The valve disc assembly includes a bleed disc that defines an orifice with a substantially non-linear contour. The orifice extends to an outer diameter of the bleed disc, and forms a bleed channel between the upper working chamber and the lower working chamber.

21 Claims, 9 Drawing Sheets

(56) References Cited

U.S. PATENT DOCUMENTS

| | | | | |
|---|---|---|---|---|
| 5,261,448 A * | 11/1993 | Furuya | ............... | B60G 17/08 137/513.5 |
| 5,316,113 A * | 5/1994 | Yamaoka | ............ | F16F 9/3484 188/282.6 |
| 5,529,154 A * | 6/1996 | Tanaka | ............... | F16F 9/3484 188/280 |
| 6,230,858 B1 | 5/2001 | Moradmand et al. | | |
| 6,382,372 B1 | 5/2002 | Keil et al. | | |
| 6,464,053 B1 * | 10/2002 | Hoebrechts | ......... | F16F 9/3405 188/282.5 |
| 6,634,379 B2 * | 10/2003 | Asadi | ................. | F16F 9/3214 137/512.1 |
| 6,802,408 B2 * | 10/2004 | Krammer | ............. | F16F 9/348 188/282.1 |
| 7,040,468 B2 * | 5/2006 | Shinata | ................ | F16F 9/348 188/282.6 |
| 7,458,448 B2 * | 12/2008 | Katou | ................. | F16F 9/3485 188/282.6 |
| 7,694,785 B2 * | 4/2010 | Nakadate | ........... | F16F 9/3484 188/266.5 |
| 7,766,137 B2 | 8/2010 | De Kock | | |
| 2005/0092565 A1 * | 5/2005 | Asadi | ................. | F16F 9/3484 188/322.15 |
| 2006/0118372 A1 * | 6/2006 | Hammer | ................ | F16F 9/34 188/284 |
| 2009/0000891 A1 * | 1/2009 | Kouyama | ............ | F16F 9/3405 188/322.15 |
| 2009/0038897 A1 * | 2/2009 | Murakami | ........... | F16F 9/3482 188/266.5 |
| 2009/0260938 A1 | 10/2009 | Hikosaka | | |
| 2012/0199430 A1 | 8/2012 | McGahey | | |
| 2012/0247889 A1 | 10/2012 | Yabe et al. | | |

* cited by examiner

ORIFICE DISC FOR REGULATING FLOW IN DAMPER

CROSS-REFERENCE TO RELATED APPLICATIONS

This application claims the benefit of U.S. Provisional Application No. 61/822,494, filed on May 13, 2013. The entire disclosure of the above application is incorporated herein by reference.

FIELD

The present disclosure relates to a damper or a shock absorber. More particularly the present invention relates to an orifice disc for controlling the damping characteristics of the shock absorber, especially during low hydraulic fluid flow.

BACKGROUND

This section provides background information related to the present disclosure which is not necessarily prior art.

Shock absorbers are used in conjunction with automotive suspension systems and other suspension systems to absorb unwanted vibrations which occur during movement of the suspension system. In order to absorb these unwanted vibrations, automotive shock absorbers are generally connected between the sprung (body) and the unsprung (suspension/chassis) masses of the vehicle.

Various types of shock absorbers have been developed to generate the desired damping forces in relation to various vehicle performance characteristics. For example, a piston located within a pressure tube of the shock absorber, is connected to the sprung portion of the automobile through a piston rod and the pressure tube is connected to the unsprung portion of the automobile. The piston is able to limit the flow of fluid between opposite sides of the piston through valving. Specifically, when the shock absorber is compressed or extended, the shock absorber is able to produce a damping force which counteracts the unwanted vibration which would otherwise be transmitted from the unsprung portion to the sprung portion of the automobile.

In another example, a dual tube shock absorber has a fluid reservoir defined between the pressure tube and a reservoir tube. A base valve located between the lower working chamber (the area below the piston) and the reservoir limits the flow of fluid between the lower working chamber and the reservoir to produce a damping force which also counteracts the unwanted vibration. The greater the degree to which the flow of fluid within the shock absorber is restricted by the piston and/or the base valve, the greater the damping forces which are generated by the shock absorber. Thus, a highly restricted flow of fluid would produce a firm ride while a less restricted flow of fluid would produce a soft ride.

Due to an exponential relationship between pressure drop and flow rate, it is difficult to obtain a damping force at relatively low piston velocities, particularly at velocities near zero, while still maintaining acceptable damping forces at the relatively high piston velocities. A low speed damping force is important to vehicle handling since most vehicle handling events are controlled by relatively low speed vehicle body velocities which thus lead to relatively low speed piston velocities.

Various systems for tuning shock absorbers during low speed movement of the piston include a fixed low speed bleed orifice which is always open across the piston and/or the base valve. The bleed orifice can be created by utilizing notches positioned, for example, on a flexible disc adjacent to the sealing land. In order to obtain the low speed control, the notches have to be small enough to create a restriction at relatively low velocities. When this is accomplished, the flow of fluid at low speeds of the valving system operates over a very small range of velocity.

As the temperature of the fluid increases or decreases, the consistency of the fluid also changes. For example, the viscosity of the fluid is higher (thick fluid) at cold temperatures and is low (thin fluid) at high temperatures. Accordingly, at high temperatures, the bleed orifice having a straight channel may not restrict the fluid flowing and at low temperatures the fluid may cause the discs to deflect prematurely, thereby affecting the damping characteristics of the shock absorber at low piston speeds.

SUMMARY

This section provides a general summary of the disclosure, and is not a comprehensive disclosure of its full scope or all of its features. The present disclosure relates to a bleed disc that restricts the flow of fluid between an upper working chamber and a lower working chamber during low piston speeds. More particularly, the present disclosure relates to a shock absorber for a vehicle. The shock absorber includes a valve disc assembly that includes the bleed disc. The bleed disc defines an orifice having a substantially non-linear contour that forms multiple portions with varying areas. The orifice extends to an outer diameter of the bleed disc. While the valve disc assembly substantially closes a passage between the upper working chamber and the lower working chamber, the orifice of the bleed disc forms a bleed channel through which a restricted amount of fluid may flow between the upper working chamber and the lower working chamber.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
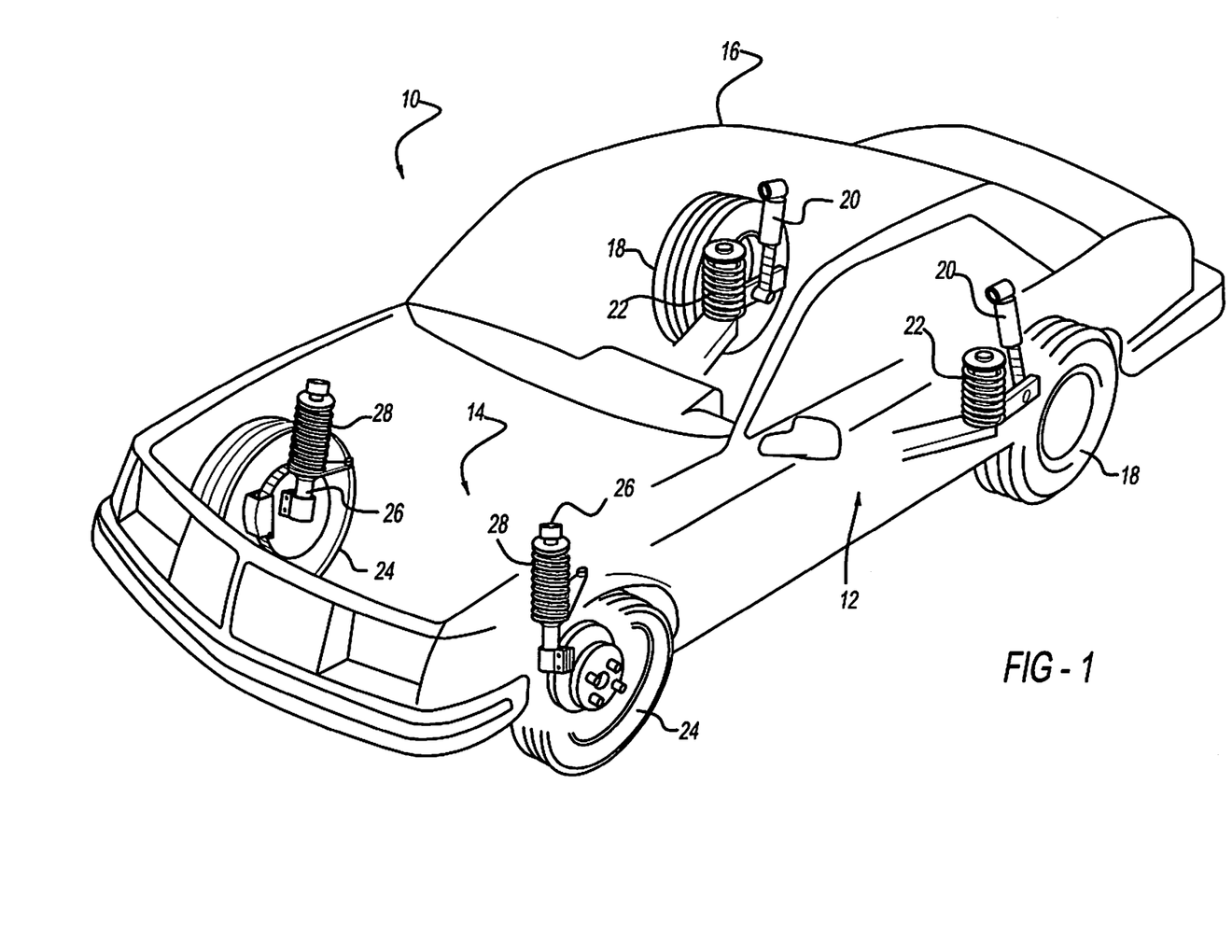
FIG. 1 is a schematic representation of a typical automobile which incorporates at least one shock absorber.

Example embodiments will now be described more fully with reference to the accompanying drawings. The following description is merely exemplary in nature and is not intended to limit the present disclosure, application, or uses. With reference to FIG. 1, a vehicle 10 incorporating a suspension system with shock absorbers having a bleed disc in accordance with the present disclosure is presented. The vehicle 10 has been depicted as a passenger car having front and rear axle assemblies. However, shock absorbers in accordance with the present disclosure may be used with other types of vehicles or in other types of applications. Examples of these alternate arrangements include, but are not limited to, vehicles incorporating non-independent front and/or non-independent rear suspensions, vehicles incorporating independent front and/or independent rear suspensions or other suspension systems known in the art. Further, the term "shock absorber" as used herein is meant to refer to dampers in general and thus includes struts and other damper designs known in the art.

The vehicle 10 includes a rear suspension 12, a front suspension 14, and a body 16. The rear suspension 12 has a transversely extending rear axle assembly (not shown) adapted to operatively support rear wheels 18. The rear axle assembly is operatively connected to the body 16 by a pair of shock absorbers 20 and a pair of springs 22. Similarly, the front suspension 14 includes a transversely extending front axle assembly (not shown) to operatively support front wheels 24. The front axle assembly is operatively connected to the body 16 by a pair of shock absorbers 26 and by a pair of springs 28. Shock absorbers 20 and 26 serve to dampen the relative motion of the unsprung portion (i.e. front and rear suspensions 14 and 12, respectively) and the sprung portion (i.e. body 16) of the vehicle 10.

Figure 2:
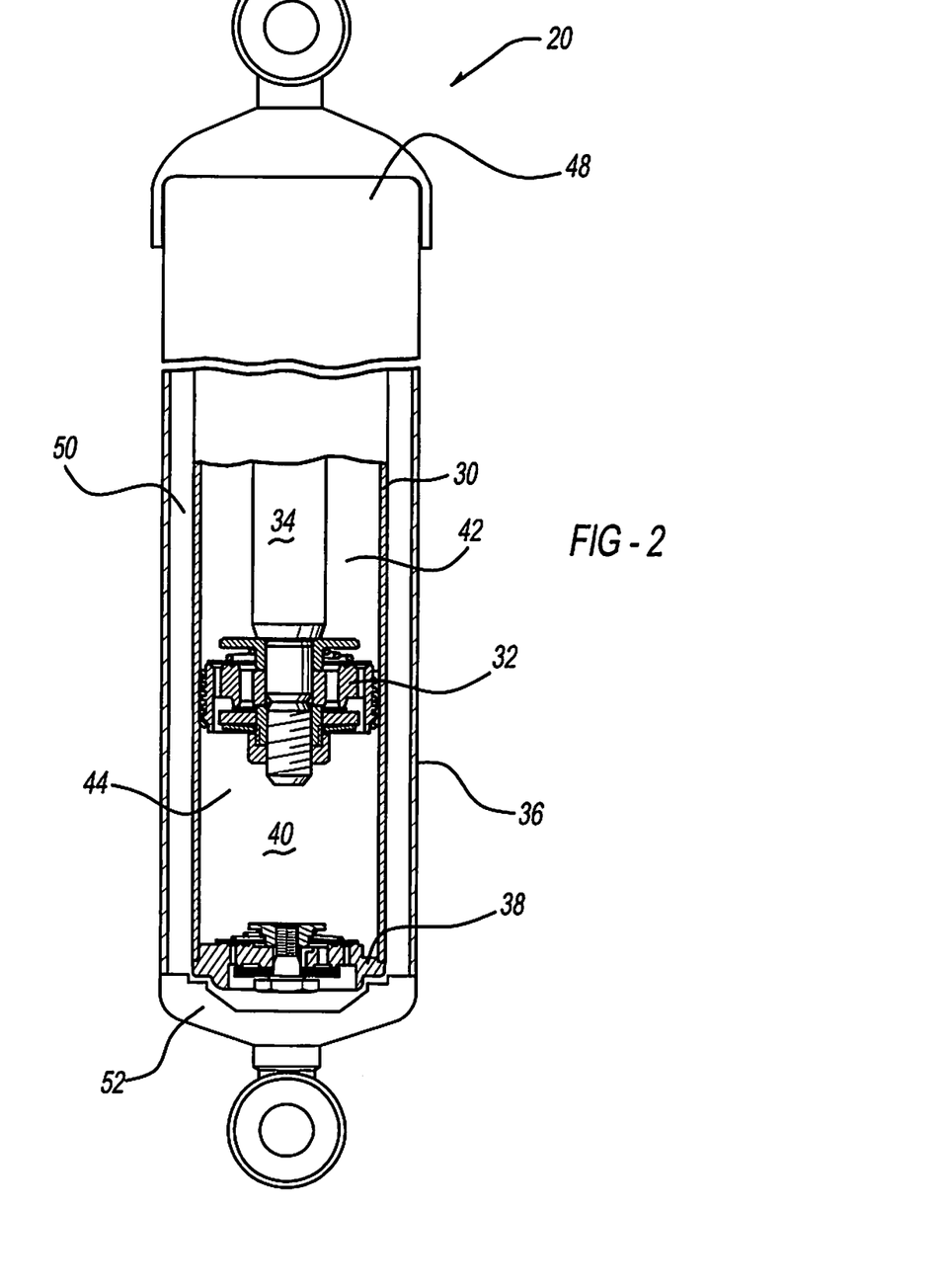
FIG. 2 is a side sectional view of an example shock absorber having a dual-tube configuration.

FIG. 2 depicts an example of the shock absorber 20. While FIG. 2 illustrates only the shock absorber 20, it is to be understood that the shock absorber 26 is substantially similar to the shock absorber 20. The shock absorber 26 differs from the shock absorber 20 only in the manner in which it is adapted to be connected to the sprung and unsprung masses of the vehicle 10. The shock absorber 20 includes a pressure tube 30, a piston assembly 32, a piston rod 34, a reserve tube 36 and a base valve assembly 38.

The pressure tube 30 defines a fluid chamber 40. The piston assembly 32 is slidably disposed within the pressure tube 30 and divides the fluid chamber 40 into an upper working chamber 42 and a lower working chamber 44. The piston rod 34 is attached to the piston assembly 32 and extends through the upper working chamber 42 and through an upper end cap 48 which closes the upper end of the pressure tube 30. The end of the piston rod 34 opposite to the piston assembly 32 is adapted to be secured to the sprung portion of vehicle 10 as discussed above. Valving within the piston assembly 32 controls the movement of fluid between the upper working chamber 42 and the lower working chamber 44 during movement of the piston assembly 32 within the pressure tube 30.

The reserve tube 36 surrounds the pressure tube 30 to define a fluid reservoir chamber 50 located between the pressure tube 30 and the reserve tube 36. The bottom end of the reserve tube 36 is closed by a base cup 52 which is adapted to be connected to the unsprung mass of the vehicle 10. The base valve assembly 38 is disposed between the lower working chamber 44 and the reservoir chamber 50 to control the flow of fluid between the chambers 44 and 50.

Figure 3A:
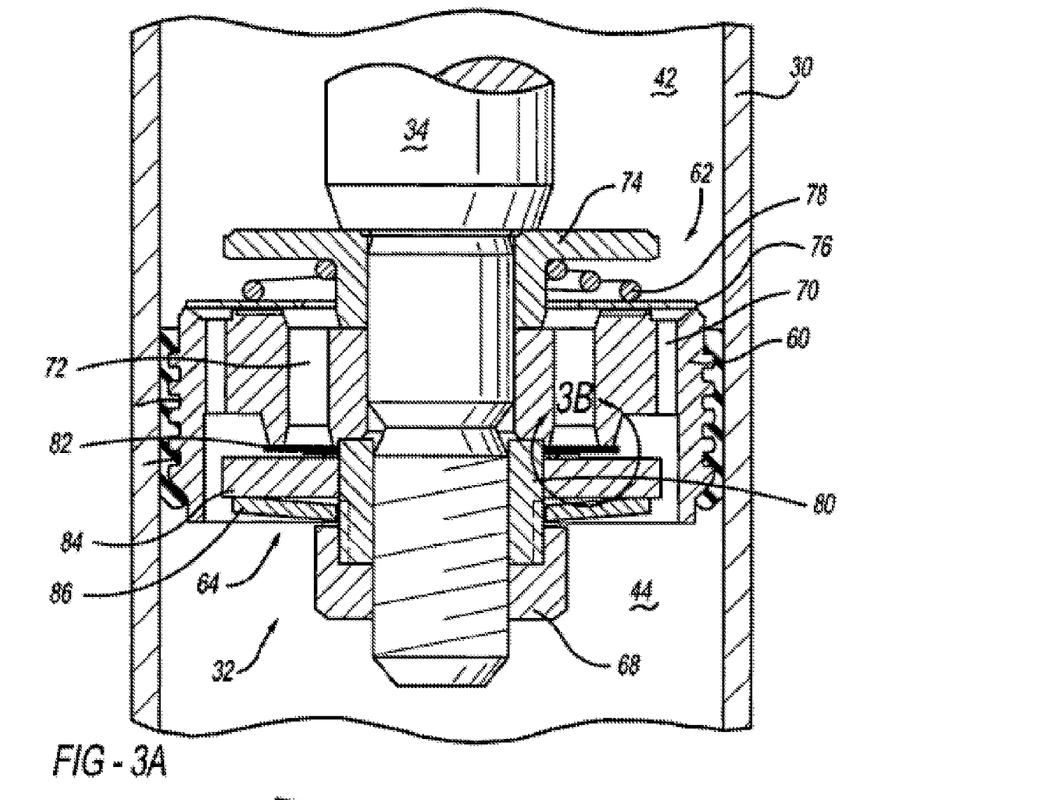
FIG. 3A is an enlarged cross-sectional view of an example piston assembly for the shock absorber of FIG. 2.
Figure 3B:
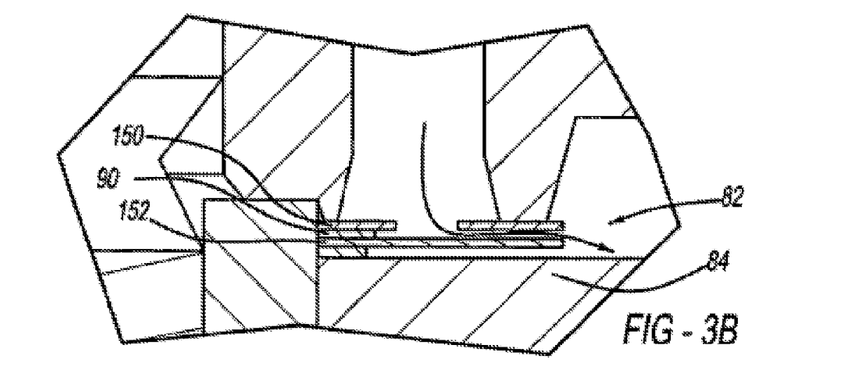
FIG. 3B is an enlarged cross-sectional view of a valve disc assembly enclosed within 3B of FIG. 3A.

With reference to FIGS. 3A and 3B, an example of the piston assembly 32 is presented. The piston assembly 32 includes a piston body 60, a compression valve assembly 62, and a rebound valve assembly 64. The piston body 60 is assembled against the compression valve assembly 62, and the rebound valve assembly 64 is assembled against the piston body 60. A nut 68 secures these components to the piston rod 34.

The piston body 60 defines a plurality of compression passages 70 and a plurality of rebound passages 72. The compression passages 70 and the rebound passages 72 extend through the piston body 60. The compression valve assembly 62 includes a retainer 74, a valve disc 76 and a spring 78. The retainer 74 abuts with the piston body 60. The valve disc 76 abuts with the piston body 60 and closes the compression passages 70 while leaving the rebound passages 72 open. The spring 78 is disposed between the retainer 74 and the valve disc 76 to bias the valve disc 76 against the piston body 60.

During a compression stroke, fluid in the lower working chamber 44 is pressurized causing fluid pressure to react against the valve disc 76. When the fluid pressure against the valve disc 76 overcomes the biasing load of the spring 78, the valve disc 76 separates from the piston body 60 to open compression passages 70 and allow fluid flow from the lower working chamber 44 to the upper working chamber 42. During a rebound stroke, the compression passages 70 are closed by the valve disc 76.

Figure 5:
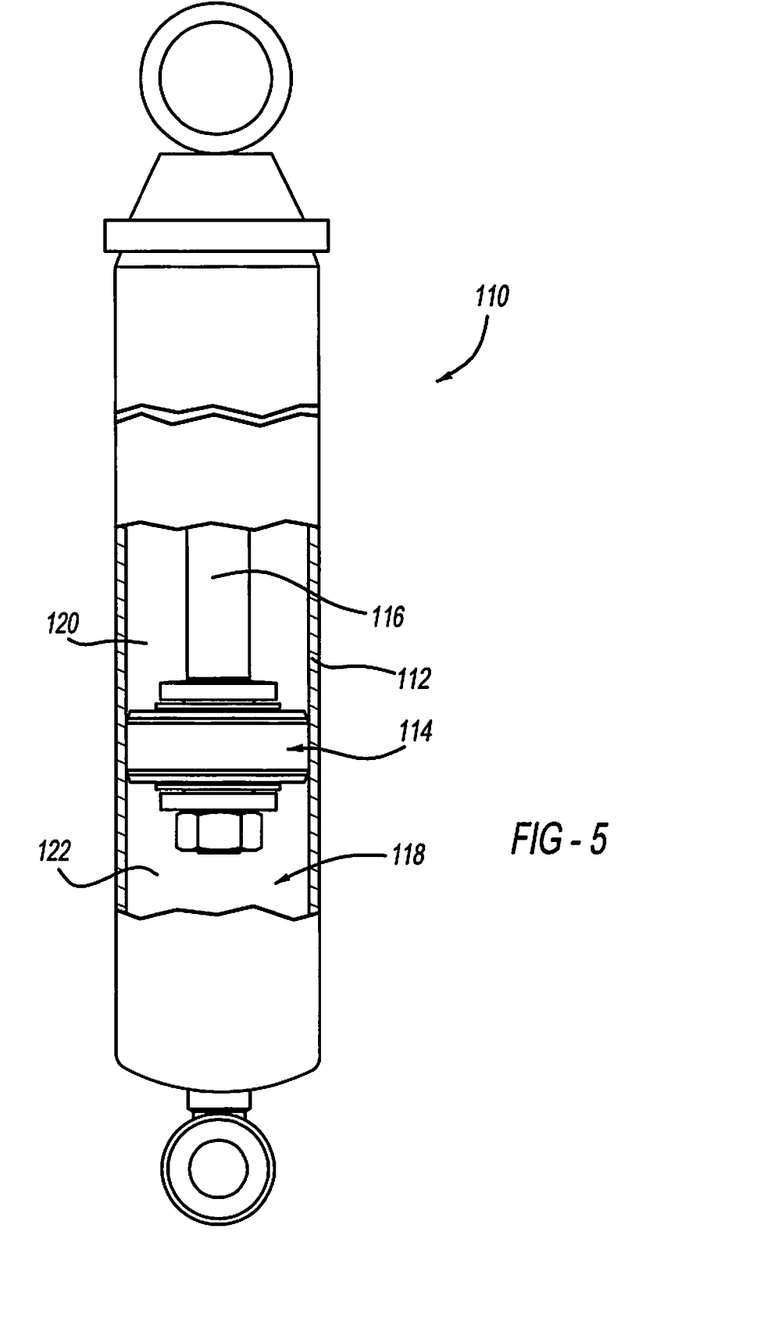
FIG. 5 is a side sectional view of an example shock absorber having a mono-tube configuration.

The rebound valve assembly 64 includes a spacer 80, a valve disc assembly 82, a retainer 84, and a spring 86. The spacer 80 is disposed between the piston body 60 and the nut 68. The spacer 80 retains the piston body 60 and the compression valve assembly 62 while permitting the tightening of the nut 68 without compressing either the valve disc 76 or the valve disc assembly 82. The valve disc assembly 82 is slidingly received on the spacer 80 and abuts with the piston body 60. The valve disc assembly 82 substantially closes the rebound passages 72 while leaving the compression passages 70 open. The retainer 74 is also slidingly received on the spacer 80 and it abuts the valve disc assembly 82. The valve disc assembly 82 includes a plurality of discs 88 in which at least one is a bleed disc 90 (FIGS. 3B and 5). The bleed disc 90 permits a limited amount of bleed flow bypassing the rebound valve assembly 64.

During a rebound stroke, fluid in the upper working chamber 42 is pressurized causing fluid pressure to react against the valve disc assembly 82. When the fluid pressure reacting against the valve disc assembly 82 overcomes the bending load for the valve disc assembly 82, the valve disc assembly 82 elastically deflects opening the rebound passages 72 allowing fluid flow from the upper working chamber 42 to the lower working chamber 44. Prior to the deflection of the valve disc assembly 82, a controlled amount of fluid flows from the upper working chamber 42 to the lower working chamber 44 through the bleed disc 90 to provide damping at low piston speeds.

Figure 4:
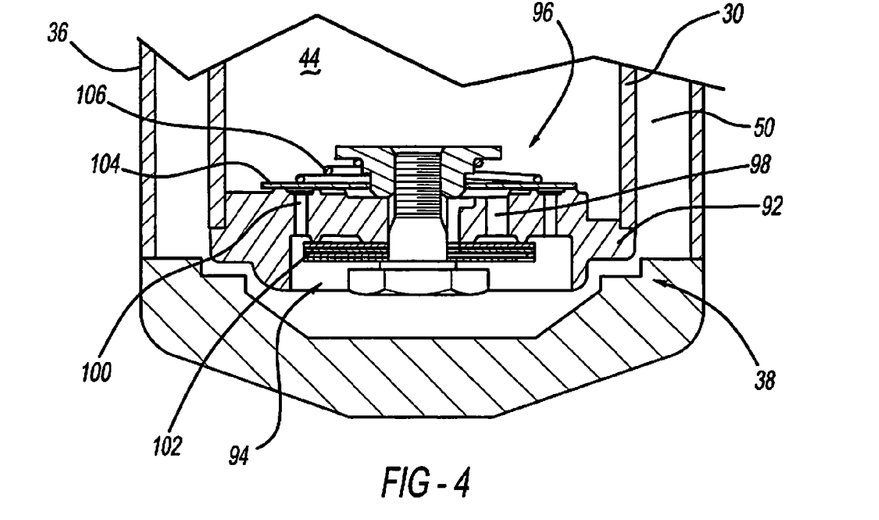
FIG. 4 is an enlarged cross-sectional view of an example base valve assembly.

With reference to FIG. 4, an example of the base valve assembly 38 is presented. The base valve assembly 38 includes a valve body 92, a compression valve assembly 94, and a rebound valve assembly 96. The valve body 92 defines a plurality of compression passages 98 and a plurality of rebound passages 100.

The compression valve assembly 94 comprises a valve disc assembly 102. The valve disc assembly 102 includes a plurality of discs in which at least one of the discs may be the bleed disc 90 to permit a limited amount of bleed flow bypassing the compression valve assembly 94. When fluid pressure is applied to the valve disc assembly 102, the discs elastically deflect at the outer peripheral edge to open the compression valve assembly 94.

During a compression stroke, fluid in the lower working chamber 44 is pressurized and the fluid pressure within the compression passages 98 eventually opens the compression valve assembly 94 by deflecting the valve disc assembly 102. The compression valve assembly 94 of the piston assembly 32 allows fluid flow from the lower working chamber 44 to the reservoir chamber 50. Prior to the deflection of the valve disc assembly 102, a controlled amount of fluid flows from the lower working chamber 44 to the reservoir chamber 50 through the bleed disc 90 to provide damping at low piston speeds.

The rebound valve assembly 96 includes a valve disc 104 and a valve spring 106. The valve disc 104 abuts to the valve body 92 and closes the rebound passages 100. The valve spring 106 biases the valve disc 104 against the valve body 92. During a rebound stroke, fluid in the lower working chamber 44 is reduced in pressure causing fluid pressure in the reservoir chamber 50 to react against the valve disc 104. When the fluid pressure against the valve disc 104 overcomes the biasing load of the valve spring 106, the valve disc 104 separates from the valve body 92 to open the rebound passages 100 and allow fluid flow from the reservoir chamber 50 to the lower working chamber 44.

During the compression stroke of the shock absorber 20, the damping characteristics may be controlled by the compression valve assembly 62 and/or the compression valve assembly 94 which accommodates the flow of fluid from the lower working chamber 44 to the reservoir chamber 50. During the rebound stroke, the damping characteristics may be controlled by the rebound valve assembly 64 and/or the rebound valve assembly 96. At low piston speeds, the damping characteristics of the shock absorber is controlled by the bleed disc 90 provided in the valve disc assembly 82 and/or the valve disc assembly 102.

Figure 6:
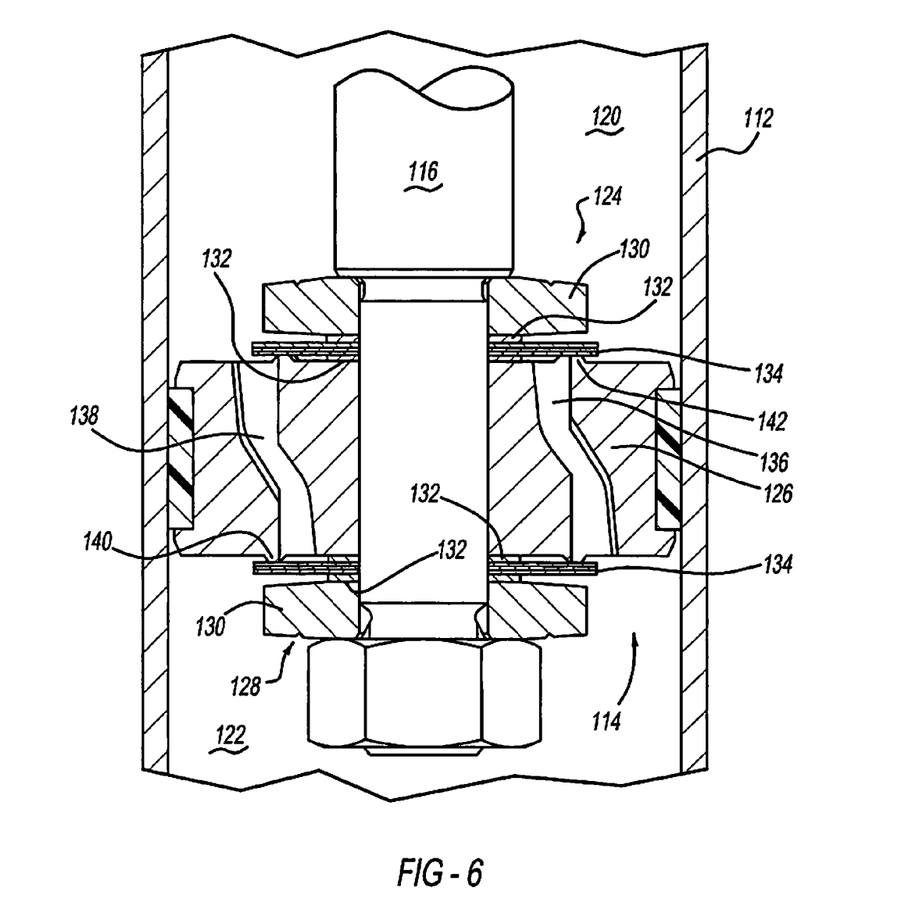
FIG. 6 is an enlarged cross-sectional view of an example piston assembly for the shock absorber of FIG. 5

In the example embodiment, the shock absorber 20 is depicted as a dual tube shock absorber. Alternatively, the shock absorber may be another type of shock absorber, such as a mono-tube shock absorber, a triple-tube shock absorber or any other suitable shock absorber known in the art. For example, FIGS. 5-6 depict an example of a shock absorber 110 having a mono-tube configuration which can be used in the vehicle 10. Similar to the shock absorber 20, the shock absorber 110 includes a pressure tube 112, a piston assembly 114, and a piston rod 116.

The pressure tube 112 defines a fluid chamber 118. The piston assembly 114 is slidably disposed within the pressure tube 112 and divides the fluid chamber 118 into an upper working chamber 120 and a lower working chamber 122. Valving within the piston assembly 114 controls the movement of fluid between the upper working chamber 120 and the lower working chamber 122 during movement of the piston assembly 114 within the pressure tube 112.

As shown in FIG. 6, the piston assembly 114 may include a compression valve assembly 124, a piston body 126, and a rebound valve assembly 128. The piston assembly 114 is arranged on the piston rod 116 such that the compression valve assembly 124 abuts with a shoulder on the piston rod 116, the piston body 126 abuts to the compression valve assembly 124, and the rebound valve assembly 128 abuts to the piston body 126.

The compression valve assembly 124 includes a retainer 130, a pair of spacers 132 and a valve disc assembly 134. In a similar manner, the rebound valve assembly includes the retainer 130, the pair of spacers 132, and the valve disc assembly 134. Accordingly, the piston assembly 114 includes the valve disc assembly 134 on either side of the piston body 126. Similar to the valve disc assembly 82, the valve disc assemblies 134 include the plurality of discs 88 which includes at least one bleed disc 90 as described herein.

The piston body 126 defines a plurality of compression passages 136 and a plurality of rebound passages 138. The compression passages 136 and the rebound passages 138 extend through the piston body 126. The valve disc assembly 134 of the compression valve assembly 124 closes the compression passages 136 and keeps the rebound passages 138 open. The valve disc assembly 134 of the rebound valve assembly 128 closes the rebound passages 138, and keeps the compression passages 136 open.

During a compression stroke, fluid in the lower working chamber 122 is pressurized and the fluid pressure within the compression passages 136 eventually opens the compression valve assembly 124 by deflecting the valve disc assembly 134. Thus, fluid flows through the compression passages 136 into the upper working chamber 120. Fluid flow through the rebound passages 138 is prohibited by the valve disc assembly 134 of the rebound valve assembly 128 which seals against a sealing land 140. Prior to the deflection of the valve disc assembly 134 of the compression valve assembly 124, a controlled amount of fluid flows from the lower working chamber 122 to the upper working chamber 120 through the bleed disc 90 to provide damping at low piston speeds.

During a rebound stroke, fluid in the upper working chamber 120 is pressurized and the fluid pressure within the rebound passages 138 eventually opens the rebound valve assembly 128 by deflecting the valve disc assembly 134. Thus, fluid flows through the rebound passages 138 into the lower working chamber 122. Fluid flow through the compression passages 136 is prohibited by the valve disc assembly 134 of the compression valve assembly 124 which seals against a sealing land 142. Prior to the deflection of the valve disc assembly 134 of the rebound valve assembly 128, a controlled amount of fluid flows from the upper working chamber 120 to the lower working chamber 122 through the bleed disc 90 to provide damping at low piston speeds.

Figure 7:
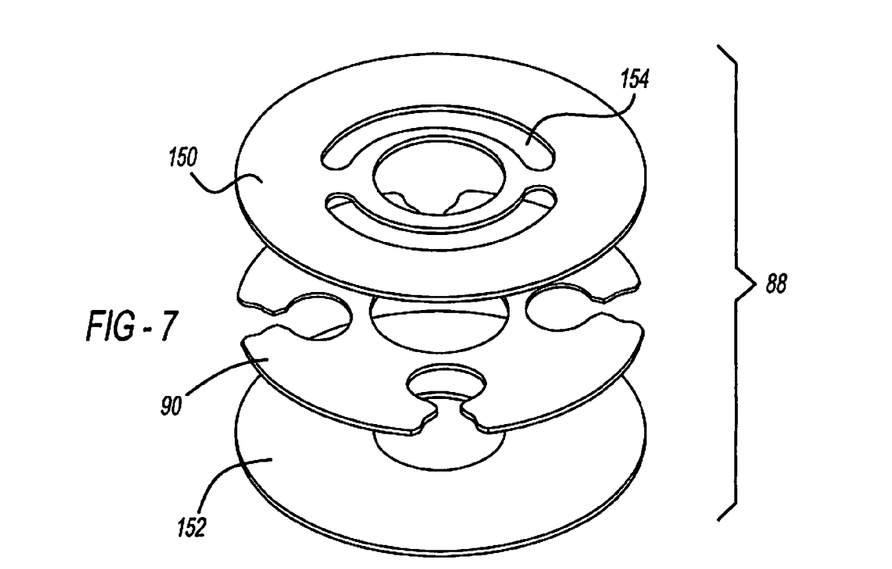
FIG. 7 is perspective view of an example valve disc assembly.

FIG. 7 depicts an example of the plurality of discs 88 having the bleed disc 90. The plurality of discs 88 may also include a reservoir disc 150 and a base disc 152. The reservoir disc 150 defines one or more apertures 154. The apertures 154 may be positioned close to the inner diameter of the reservoir disc 150. The bleed disc 90 can be disposed between the reservoir disc 150 and the base disc 152. The base disc 152 fully covers the bleed disc 90. It is understood that the valve disc assemblies (82, 102, 134) herein may have different number of discs and different types of bleed discs. For example, the valve disc assembly for a piston assembly may be different from a valve disc assembly for a base valve assembly.

FIGS. 8-10B depict an example of the bleed disc 90. The bleed disc 90 defines one or more orifices 200. Each orifice 200 has a substantially non-linear contour with multiple portions or sections that have different areas. For example, the orifice 200 may have a flow reservoir 204, a bleed channel 206, and an outlet 208. The orifice 200 extends from a position close to an inner diameter 210 to the outer diameter 212. The flow reservoir 204 is formed close to the inner diameter 210 of the bleed disc 90. In the assembled condition, each flow reservoir 204 of the bleed disc 90 aligns with the apertures 154 of the reservoir disc 150. The fluid flowing through the piston enters the apertures 154 and collects in the flow reservoirs 204.

Figures 9, 10A, 10B:
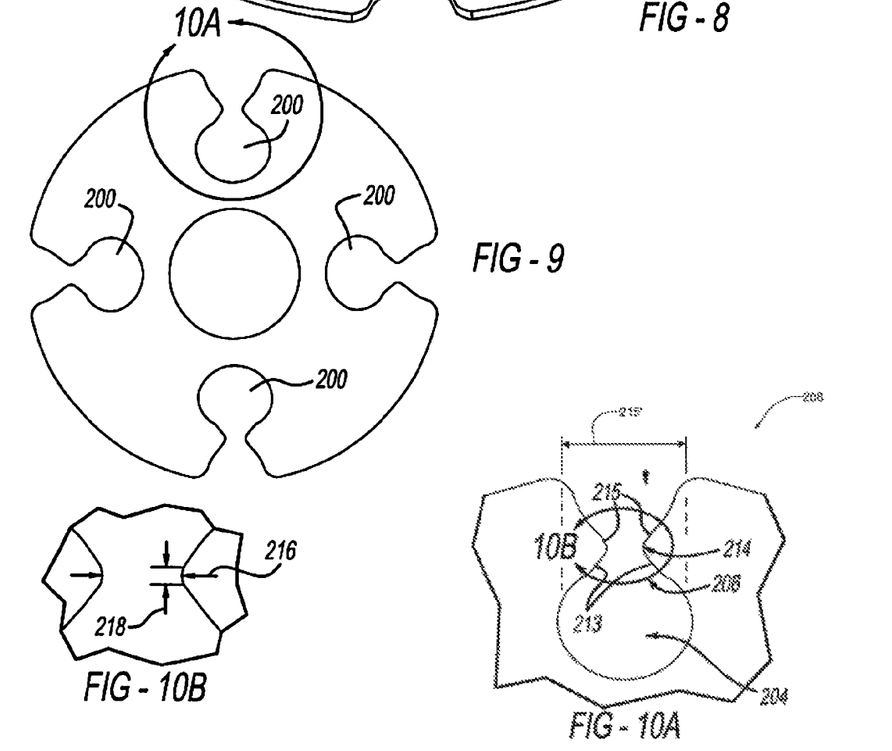
FIG. 9 is a top view of the bleed disc of FIG. 8.
FIG. 10A is an enlarged view of an orifice of the bleed disc enclosed within 10A in FIG. 9.
FIG. 10B is an enlarged view of a choke point of the orifice enclosed within 10B in FIG. 10A.

The bleed channel 206 fluidly couples the flow reservoir 204 and the outlet 208. As shown in FIG. 10A, the bleed channel 206 may have an inlet portion 213, a choke point 214, and an outlet portion 215. The inlet portion 213 couples the flow reservoir 204 and the choke point 214. The outlet portion 215 couples the choke point 214 and the outlet 208. The inlet portion 213 and the outlet portion 215 each have a tapered opening that gradually decreases toward the choke point 214, thereby forming the bleed channel 206 having an hour glass shape. The choke point 214 has a width 216 and a length 218 to restrict the flow of fluid from the flow reservoir 204 to the outlet 208 (FIG. 10B). The outlet 208 extends from the choke point 214 to the outer diameter 212 of the bleed disc 90. The outlet portion 215 forms an opening at the outer diameter of the bleed disc 90 which has a length substantially similar to a width of the flow reservoir 204. The flow reservoir 204, the bleed channel 206, and the outlet 208 of the orifice 200 form a varying flow area which extends from a position close to the inner diameter 210 to the outer diameter 212. More particularly, the orifice 200 has a nozzle design to control the flow of fluid. As fluid collects in the flow reservoir 204, the fluid flows through the bleed channel 206. The flow reservoir 204 and the outlet 208 have an area larger than the choke point 214. Accordingly, as the fluid flows from the flow reservoir 204 into the bleed channel 206, the pressure of the fluid increases due to the decrease in area. Thus, the velocity of the fluid entering the choke point 214 may decrease. Furthermore, as the fluid flows from the choke point 214 into the outlet 208, the pressure of the fluid decreases, thereby increasing the velocity of the fluid. Specifically, the fluid flows from an area of high pressure (i.e., the choke point 214) to an area of low pressure (i.e., outlet 208). The pressure formed by the choke point 214 pushes the fluid out into the outlet 208.

The choke point 214 is configured such that the change in velocity of the fluid is due to the change in pressure as the fluid flows through the bleed channel 206. In addition to an increase in pressure, the temperature of the fluid may also increase as the fluid flows through the choke point 214. Accordingly, the length of the choke point 214 is minimized to reduce an increase in temperature of the fluid. Specifically, the width 216 of the choke point 214 is greater than the length 218 of the choke point 214. Furthermore, the fluid flows through the outlet 208 which has a larger width than the choke point 214, and, thus, allows the fluid to spread into a larger area, thereby cooling the fluid.

The profile of the bleed channel 206 controls the damping characteristics of the shock absorber during low piston speeds. More particularly, the choke point 214 of the bleed channel 206 restricts the amount of fluid flowing through the orifice 202. For example, the width 216 of the choke point 214, the length 218 of the choke point 214, the angle of the inlet portion 213, the angle of the outlet portion 215, and the thickness of the bleed disc 90 can be adjusted to optimize the damping characteristics of the shock absorber during low piston speeds. Thus, the orifice of the bleed disc can be adjusted based on the desired dampening characteristics of the shock absorber.

Figure 8:
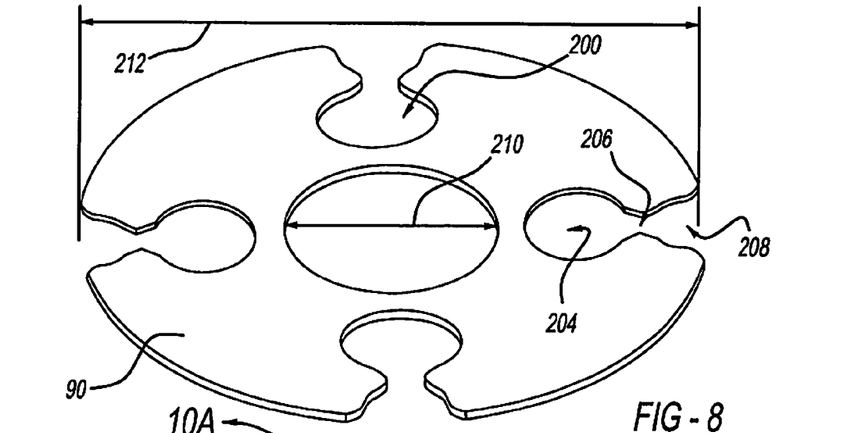
FIG. 8 is a perspective view of an example bleed disc for the valve disc assembly.

While FIGS. 8 and 9 depict the bleed disc 90 as including four orifices 200, the bleed disc 90 may have one or more orifices 200. Furthermore, the valve disc assembly may include more than three discs 88, where at least one of the discs 88 is the bleed disc 90.

Figures 11A, 11B, 11C, 11D:
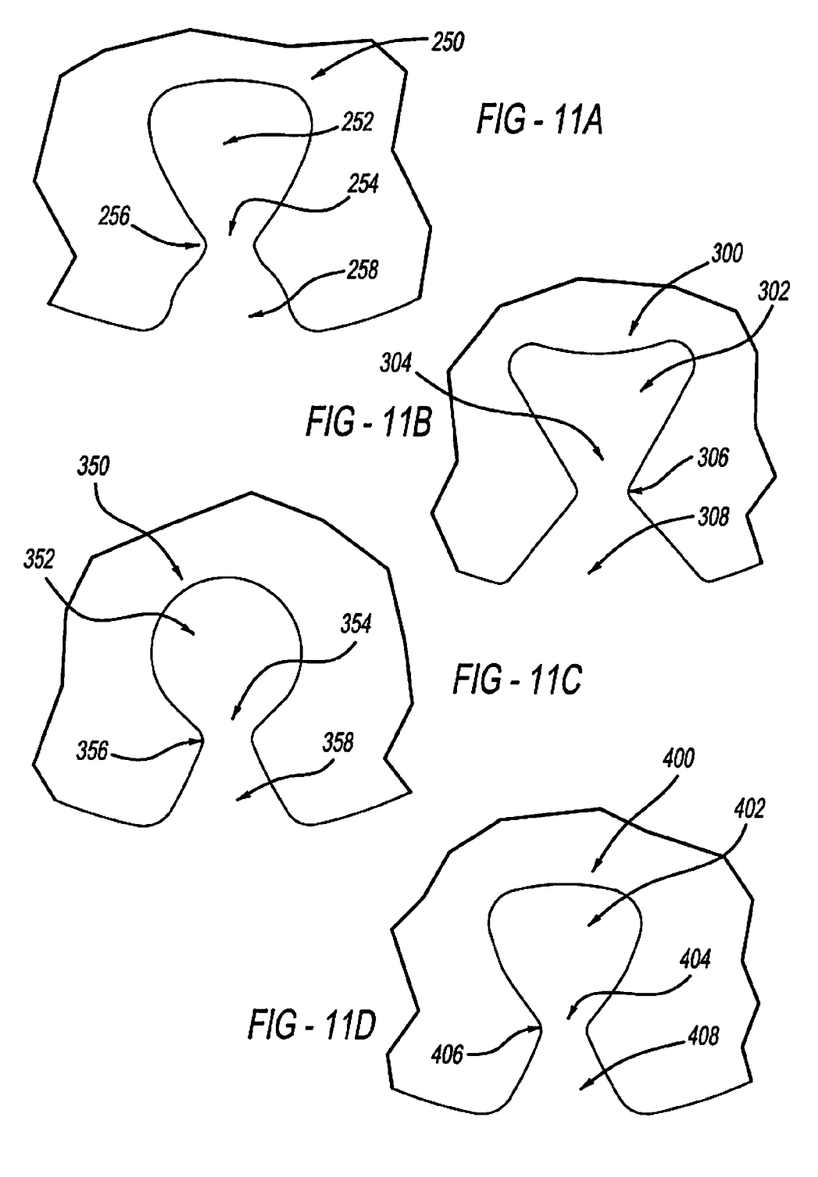
FIGS. 11A, 11B, 11C, and 11D are multiple examples of an orifice for the bleed disc.

The shape of the orifice 200 may also vary. For example, FIGS. 11A-11D depict different types of orifices. FIG. 11A depicts an orifice 250 which includes a flow reservoir 252, a bleed channel 254 with a choke point 256, and an outlet 258. The flow reservoir 252 has a tear-drop shape, and the profile of the outlet 208 has a curved shape.

FIG. 11B depicts an orifice 300 which includes a flow reservoir 302, a bleed channel 304 with a choke point 306, and an outlet 308. The flow reservoir 302 has a heart like shape, and the profile of the outlet 308 has a "V" like shape or a tapered linear shape.

FIG. 11C depicts an orifice 350 which includes a flow reservoir 352, a bleed channel 354 with a choke point 356, and an outlet 358. The flow reservoir 352 has a circular shape, and the profile of the outlet 358 has a "V" like shape or a tapered linear shape.

FIG. 11D depicts an orifice 400 which includes a flow reservoir 402, a bleed channel 404 with a choke point 406, and an outlet 408. The flow reservoir 402 has a tear-drop shape like FIG. 11A, and the profile of the outlet 408 has a "V" like shape or a tapered linear shape.

Similar to the orifice 200 of FIGS. 8-10, the orifices (250, 300, 350, 400) have a profile with varying area. The orifices (250, 300, 350, 400) of FIGS. 11A-11D, are configured such that the flow reservoir (252, 302, 352, 402) and the outlet (258, 308, 358, 408) have a larger area than the choke point (256, 306, 356, 406). Accordingly, the fluid flowing through the bleed channel (254, 304, 354, 404) experiences a change in velocity due to the change in pressure.

Figures 12A, 12B:
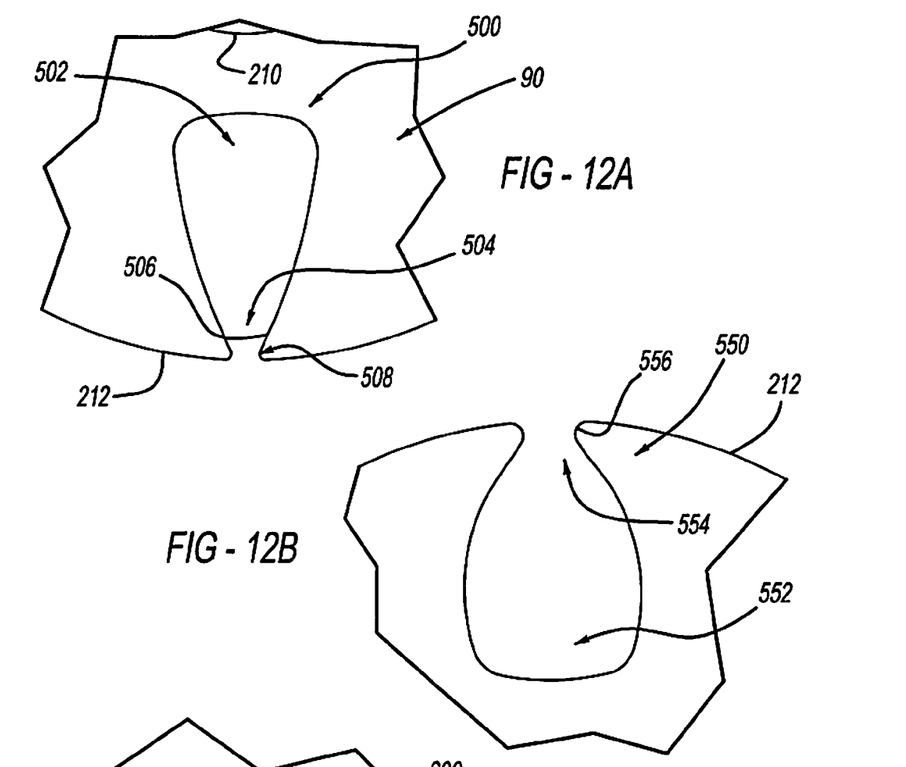
FIGS. 12A and 12B are examples of an orifice for the bleed disc with a choke point at an outer diameter of the bleed disc.

In the example embodiments shown in FIGS. 8-11 D, the choke point is positioned between the flow reservoir and the outlet. Alternatively, the position of the choke point may be adjusted to control the damping characteristics of the shock absorber. For example, FIGS. 12A-12B depict an orifice 500 and an orifice 550. The orifices 500 and 550 have choke points 508 and 556, respectively, positioned substantially at the outer diameter 212 of its associated bleed disc 90. Specifically, the orifice 500 includes a flow reservoir 502 and a bleed channel 504. The flow reservoir 502 is positioned close to the inner diameter 210 of the bleed disc 90, and extends to the choke point 508.

The bleed channel 504 includes an inlet portion 506 and the choke point 508. The inlet portion 506 forms a tapered passage toward the choke point 508 with the flow reservoir 502. The choke point 508 is disposed at the outer diameter 212 of the bleed disc 90. More particularly, the fluid from the flow reservoir 502 flows through the choke point 508 and bleeds out from the bleed disc 90. The fluid does not flow into an outlet of the orifice before bleeding out from the bleed disc 90. Instead, the fluid flows directly out of the bleed disc 90.

The orifice 550 of FIG. 12B depicts another example of an orifice which has a flow reservoir 552 and a bleed channel 554 with the choke point 556 at the outer diameter 212. The flow reservoir 552 has a wider tear-drop shape than the flow reservoir 502, and the choke point 556 has a width greater than the choke point 508.

Similar to the orifice 200, the orifices 500, 550 have a profile with varying area. Specifically, the flow reservoirs 502, 552 each have a larger area than then respective choke point 508, 556. Furthermore the area of the flow reservoir 502, 552 varies such that the area closest to the inner diameter 210 of the bleed disc 90 is greater than the area closest to the outer diameter 212 of the bleed disc 90. Accordingly, as the fluid flows from the flow reservoir 502, 552 into the bleed channels 504, 554, the pressure of the fluid increases due to the decrease in area. Thus, the velocity of the fluid entering the choke points 508, 556 decreases. Furthermore, as the fluid bleeds out from the choke points 508, 556, the pressure of the fluid decreases, thereby increasing the velocity of the fluid. Specifically, the fluid flows from an area of high pressure (i.e., the choke points 508,556) to an area of low pressure (i.e, out of the bleed disc 90). The pressure formed by the choke points 508, 556 pushes the fluid out.

Figure 13:
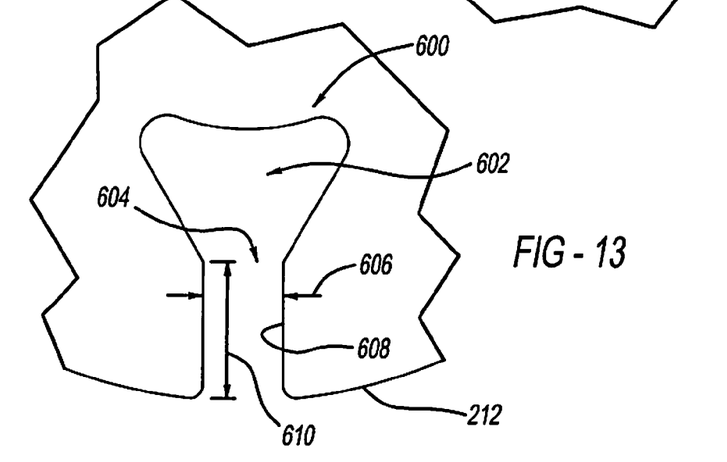
FIG. 13 is an example of an orifice for the bleed disc with a choke point extending to an outer diameter of the bleed disc.

FIG. 13 depicts an orifice 600 which also has a profile with varying area. The orifice 600 has a flow reservoir 602 and a bleed channel 604. The bleed channel 604 has a width 606 which forms a choke point 608. The choke point 608 has a length 610 which extends to the outer diameter 212 of the bleed disc 90.

The flow reservoir 602 has a width and area greater than the choke point 608. Accordingly, as the fluid flows from the flow reservoir 602 into the bleed channel 604, the pressure of the fluid increases due to the decrease in area. Thus, the velocity of the fluid entering the choke point 608 decreases. Furthermore, as the fluid flows out or bleeds out from the choke point 608, the pressure of the fluid may decrease, thereby increasing the velocity of the fluid. Specifically, the fluid flows from an area of high pressure (i.e., the choke point 608) to an area of low pressure (i.e, out of the bleed disc 90). However, the length 610 of the choke point 608 is longer than the length 218 of the choke point 214. With the longer length, the temperature of the fluid flowing through the choke point 608 may also increase. Thus, changing the viscosity of the fluid. The change in viscosity causes a change in pressure which affects the damping characteristics of the shock absorber during low piston speeds. Accordingly, while the orifice 600 has varying area, it is preferred to minimize the length of the choke point to control or restrict the flow fluid through the orifice.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, and/or components, but do not preclude the presence or addition of one or more other features, elements, components, and/or groups thereof.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A shock absorber for a vehicle comprising:
a pressure tube defining a fluid chamber;
a piston disposed within the fluid chamber, the piston dividing the fluid chamber into an upper working chamber and a lower working chamber, the piston defining a compression passage and a rebound passage, wherein the compression passage and the rebound passage extend through the piston between the upper working chamber and the lower working chamber;
a valve disc assembly engaging the piston and controlling the flow of fluid between the upper working chamber and the lower working chamber, wherein the valve disc assembly includes a bleed disc that defines an orifice with a substantially non-linear contour that extends to an outer diameter of the bleed disc, the orifice of the bleed disc forming a bleed channel between the upper working chamber and the lower working chamber;

wherein the orifice includes a flow reservoir, a choke point, an inlet portion and an outlet portion, the choke point being disposed between the flow reservoir and the outlet portion, and the choke point providing a cross sectional area less than that of the flow reservoir and the outlet to enable the choke point to accelerate the flow of fluid from the flow reservoir to the outlet; and wherein the inlet portion forms a wall portion that tapers toward the choke point and the outlet portion forms a wall portion that tapers away from the choke point, and wherein the outlet portion forms an opening at the outer diameter of the bleed disc which has a length substantially similar to a width of the reservoir at a widest point of the reservoir.

2. The shock absorber of claim 1 wherein the flow reservoir is positioned in proximity of an inner diameter of the bleed disc, and the choke point is positioned in proximity of the outer diameter.

3. The shock absorber of claim 1 wherein the flow reservoir of the bleed disc has a substantially rounded shape and the choke point has an hour glass shape, the choke point being fluidly coupled to the flow reservoir at one end and to the outlet at the other end.

4. The shock absorber of claim 1 wherein the bleed disc includes a plurality of the orifices.

5. The shock absorber of claim 1 wherein a length of the choke point is less than a width of the choke point.

6. The shock absorber of claim 5 wherein the outlet portion extends to the outer diameter of the bleed disc.

7. The shock absorber of claim 1 wherein the valve disc assembly includes a plurality of discs, and the bleed disc is among the plurality of discs.

8. The shock absorber of claim 1 further comprising:
a compression valve assembly controlling the flow of fluid between the compression passage and the upper working chamber, wherein the compression valve assembly opens the compression passage in response to a pressure exerted onto the compression valve assembly by the fluid in the lower working chamber, and
a rebound valve assembly controlling the flow of fluid between the rebound passage and the lower working chamber, wherein the rebound valve assembly opens the rebound passage in response to a pressure exerted onto the rebound valve assembly by the fluid in the upper working chamber.

9. The shock absorber of claim 8 wherein
the compression valve assembly and the rebound valve assembly each include the valve disc assembly,
the valve disc assembly of the compression valve assembly forms the bleed channel between the compression passage and the upper working chamber, and
the valve disc assembly of the rebound valve assembly forms the bleed channel between the rebound passage and the lower working chamber.

10. A shock absorber for a vehicle comprising:
a pressure tube defining a fluid chamber;
a piston disposed within the fluid chamber, the piston dividing the fluid chamber into an upper working chamber and a lower working chamber, the piston defining a compression passage and a rebound passage, wherein the compression passage and the rebound passage extend through the piston between the upper working chamber and the lower working chamber;
a compression valve assembly engaging the piston, wherein the compression valve assembly controls the flow of fluid through the compression passage;
a rebound valve assembly engaging the piston and controlling the flow of fluid through the rebound passage, the rebound valve assembly including a valve disc assembly, wherein the valve disc assembly includes a bleed disc that defines an orifice that fluidly couples the rebound passage and the lower working chamber, the orifice has a substantially non-linear contour that extends to an outer diameter of the bleed disc, the orifice further having an inlet portion, an outlet portion, and a choke point positioned before the outer diameter and between the inlet portion and the outlet portion, the choke point operating to accelerate a flow of the fluid therethrough; and wherein the inlet portion forms a wall portion that tapers toward the choke point and the outlet portion forms a wall portion that tapers away from the choke point, and wherein the outlet portion forms an opening at the outer diameter of the bleed disc which has a length substantially similar to a width of the reservoir at a widest point of the reservoir.

11. The shock absorber of claim 10 wherein a length of the choke point is smaller than a width of the choke point.

12. The shock absorber of claim 10 wherein the bleed disc includes a plurality of the orifices.

13. The shock absorber of claim 10 wherein the choke point has an area smaller than the inlet portion and smaller than the outlet portion.

14. The shock absorber of claim 10 wherein the orifice of the bleed disc has a flow reservoir disposed in proximity of an inner diameter of the bleed disc, the choke point has the outlet portion defined at the outer diameter of the bleed disc and the inlet portion fluidly coupled to the flow reservoir, and an area of the choke point is smaller than an area of the flow reservoir.

15. The shock absorber of claim 10 wherein the orifice of the bleed disc has a first portion that substantially has a rounded shape, the choke point substantially has an hour glass shape, the choke point is fluidly coupled to the inlet portion at one end and the outlet portion at the other end opposite of the inlet portion.

16. The shock absorber of claim 10 wherein the valve disc assembly of the rebound valve assembly includes a plurality of discs, and the bleed disc is among the plurality of discs.

17. The shock absorber of claim 10 wherein
the compression valve assembly includes a second valve disc assembly, the second valve disc assembly includes a bleed disc that defines an orifice that fluidly couples the compression passage and the upper working chamber, the orifice has a substantially non-linear contour that extends to an outer diameter of the bleed disc and has a choke point positioned before the outer diameter.

18. A shock absorber for a vehicle comprising:
a pressure tube defining a fluid chamber;
a piston disposed within the fluid chamber, the piston dividing the fluid chamber into an upper working chamber and a lower working chamber, the piston defining a first compression passage and a first rebound passage, wherein the first compression passage and the first rebound passage extend through the piston between the upper working chamber and the lower working chamber;

a first compression valve assembly engaging the piston, wherein the first compression valve assembly controls the flow of fluid through the first compression passage;

a first rebound valve assembly engaging the piston and controlling the flow of fluid through the first rebound passage, the first rebound valve assembly including a first valve disc assembly, wherein the first valve disc assembly includes a bleed disc that defines an orifice that fluidly couples the rebound passage and the lower working chamber, the orifice has a substantially non-linear contour that extends to an outer diameter of the bleed disc and has a choke point positioned before the outer diameter;

a reserve tube surrounding the pressure tube, wherein the reserve tube and the pressure tube define a reservoir chamber;

a valve body defining a second compression passage and a second rebound passage, the second compression passage and the second rebound passage extend through the valve body between the lower working chamber and the reservoir chamber;

a second compression valve assembly engaging the valve body and controlling the flow of fluid through the second compression passage, the second compression valve assembly including a second valve disc assembly, wherein the second valve disc assembly includes a bleed disc that defines an orifice that fluidly couples the second compression passage and the reservoir chamber, the orifice has a substantially non-linear contour that extends to an outer diameter of the bleed disc and has a choke point positioned before the outer diameter, the choke point forming a reduced cross sectional area portion having a hour glass shape that serves to accelerate the flow of fluid therethrough;

a second rebound valve assembly engaging the valve body, wherein the second rebound valve assembly controls the flow of fluid through the second rebound passage; and wherein the orifice further defines an inlet portion that forms a wall portion that tapers toward the choke point, and an outlet portion that forms a wall portion that tapers away from the choke point, and wherein the outlet portion forms an opening at the outer diameter of the bleed disc which has a length substantially similar to a width of the reservoir at a widest point of the reservoir.

19. The shock absorber of claim 18 wherein the orifices of the bleed discs of the first valve disc assembly and the second valve disc assembly each define a flow reservoir disposed in proximity of the inner diameter of the bleed discs, the flow reservoir is fluidly coupled to the choke point, and an area of the flow reservoir is greater than an area of the choke point.

20. The shock absorber of claim 18 wherein each of the orifices of the bleed discs has the outlet portion fluidly coupled to the flow reservoir by way of the choke point, the outlet portion extends to the outer diameter of the bleed disc, and an area of the outlet is larger than the area of the choke point.

21. The shock absorber of claim 18 wherein for the bleed discs of the first valve disc assembly and the second valve disc assembly, a length of the choke points is smaller than a width of the choke points.

* * * * *